(12) United States Patent
Zdinak et al.

(10) Patent No.: US 6,798,965 B2
(45) Date of Patent: Sep. 28, 2004

(54) LOW LOSS FIBER OPTIC JUMPER WITH ELECTRONIC PRESENCE DETECTION

(75) Inventors: Paul S. Zdinak, Candia, NH (US); Michael Sussman, Winchester, MA (US)

(73) Assignee: Confluent Photonics Corporation, Salem, NH (US)

( * ) Notice: Subject to any disclaimer, the term of this patent is extended or adjusted under 35 U.S.C. 154(b) by 370 days.

(21) Appl. No.: 09/866,272

(22) Filed: May 25, 2001

(65) Prior Publication Data

US 2002/0009266 A1 Jan. 24, 2002

Related U.S. Application Data

(63) Continuation-in-part of application No. 09/724,803, filed on Nov. 28, 2000.
(60) Provisional application No. 60/208,480, filed on Jun. 2, 2000.

(51) Int. Cl.[7] .............................. G02B 6/46; H04J 14/02
(52) U.S. Cl. ......................... 385/134; 385/147; 398/83
(58) Field of Search ............................... 385/134–137, 385/147; 398/79–88

(56) References Cited

U.S. PATENT DOCUMENTS

| | | | |
|---|---|---|---|
| 4,589,724 A | 5/1986 | Winzer | 350/96.15 |
| 4,952,798 A * | 8/1990 | Graham et al. | 250/227.11 |
| 5,109,983 A * | 5/1992 | Malone et al. | 206/408 |
| 5,155,785 A * | 10/1992 | Holland et al. | 385/89 |
| 5,199,099 A * | 3/1993 | Dalgoutte | 385/135 |
| 5,751,454 A * | 5/1998 | MacDonald et al. | 359/119 |
| 5,774,245 A | 6/1998 | Baker | 359/128 |
| 6,002,331 A | 12/1999 | Laor | 340/539 |
| 6,305,848 B1 * | 10/2001 | Gregory | 385/53 |

OTHER PUBLICATIONS

Copy of International Search Report for PCT/US 01/17828 (2 pages).

* cited by examiner

Primary Examiner—Akm Enayet Ullah
Assistant Examiner—Jerry T Rahll
(74) Attorney, Agent, or Firm—Hunton & Williams LLP

(57) ABSTRACT

A bi-directional fiber optic jumper that connects two fiber optic system common wavelength fibers is disclosed. The retraction of the jumper exposes fiber connections and enables a system reconfiguration such as adding or dropping of common wavelengths into open fiber connections. A magnet is provided in the chassis of the jumper to engage a magneto-resistive device, such as a Hall effect sensor feature, that is contained on an optical add/drop device product chassis. The Hall effect sensor facilitates monitoring of insertion or withdrawal of the fiber channel jumper from the optical add/drop device.

23 Claims, 10 Drawing Sheets ns. This
LOW LOSS FIBER OPTIC JUMPER WITH ELECTRONIC PRESENCE DETECTION

CROSS-REFERENCE TO RELATED APPLICATIONS

This patent application is related to U.S. patent application Ser. No. 09/382,492, filed Aug. 25, 1999, which is hereby incorporated by reference herein in its entirety. This application also claims the benefit of provisional application Ser. No. 60/208,480, filed Jun. 2, 2000. Additionally, this application is a continuation-in-part of U.S. patent application Ser. No. 09/724,803 Nov. 28, 2000.

FIELD OF THE INVENTION

This invention relates generally to a fiber optic network. More particularly the invention relates to a fiber channel jumper that may connect two fiber optic system common wavelength fibers or may be used to add or drop common wavelengths into open fiber connections.

BACKGROUND OF THE INVENTION

In telecom, video transport systems and other fiber optic network applications, it is desirable for a fiber optic OAD (Optical Add Drop) product to have low fiber optic insertion loss and some form of electrical monitoring of individual wavelength channels within an OAD network system element. Typically, an OAD is basically two wavelength division multiplexing (WDM) devices capable of multiplexing and de-multiplexing multiple channels or wavelengths of light. Typically, a plurality of individual fibers are provided wherein each individual fiber communicates a particular wavelength or channel of light and another individual fiber communicates a polychromatic light signal comprising the particular wavelengths communicated by the plurality of individual fibers. A major function of the OAD is to pass thru or express selected individual fiber channels connected to an OAD system element. Expressing is therefore accomplished by selectively placing jumpers between the mux/demux and demux/mux devices within the OAD.

Conventional OAD systems utilize optical jumpers that have high insertion loss, which may exceed 1–3 dB. Typical connectors that have been used may be generally classified into five major categories, including resilient ferrule, rigid ferrule, grooved plate hybrids, expanded beam and rotary.

Desirable attributes of a jumper component include ease of installation and the ability to provide low optical power loss with a single mode fiber optic cable. One type of typical related art fiber optic jumpers is a jumper having a "duplex" configuration. A disadvantage and problem of a "duplex" configuration is that such a configuration imposes a tight bend radius on single mode fibers. The tight bend radius creates excessive fiber optic power loss.

SUMMARY OF THE INVENTION

To overcome the problem of conventional OAD systems having optical jumpers with high insertion loss, and inconvenience associated with a plurality of fiber optic cables protruding from a typical OAD, fiber optic jumpers may be utilized. Low optic loss can be achieved by mechanically positioning the jumper at a 1 inch pitch rather than the standard duplex ½ inch pitch, which commonly found in the art. Additionally, low optic loss can be achieved by controlling the fiber loop radius. The physical presence of a fiber optic jumper in an optical add/drop device allows for connection of two fiber optic system common wavelength fibers. The fiber optic jumper of the invention has a casing. A first end of an optical fiber and a second end of the optical fiber extend out of a connector end of the casing. The retraction of the jumper from the OAD exposes fiber optic connections in the OAD and enables a system reconfiguration such as adding or dropping of common wavelengths into open fiber connections. An installed fully bi-directional jumper redirects light within an optical transport system. A bi-directional jumper allows for an additional layer of fiber optic network monitoring intelligence to what is commonly a passive fiber optic transport system.

An installed presence detection function to provide electrical network system intelligence is also desirable for OAD systems. One embodiment of a presence detection device is a physical switch, which is either active or passive and which is activated upon insertion of the jumper. Several types of presence switches may be used including: 1) a silicone pushbutton utilizing a conductive pad; 2) a metal or polyester dome switch construction; 3) an infrared transmitter and receiver; 4) a magneto-resistive device, such as a magnetic Hall effect sensor; or other types of presences switches. In one embodiment, a magnet is provided in the chassis of the jumper to engage a Hall effect sensor feature contained on the OAD product chassis to facilitate monitoring of the insertion or withdrawal of the fiber channel jumper. The magnetic Hall effect sensor is preferred because the components may be designed as a sealed construction non tactile interface, which greatly increases the reliability of the presence switch.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

An optical add/drop device is used to add, drop and route a plurality of optical signals from various wavelength division multiplexers. Modern wavelength division multiplexers are capable of transmitting a plurality, e.g. 49, signals over a single polychromatic fiber optic cable. Each of the signals are typically broken out into separate monochromatic optical signals. For purposes of this application, a monochromatic optical signal is defined as a narrowband optical signal. Each of the monochromatic optical signals are typically routed to a port in an optical add/drop device where the signal is then routed to a desired location. Oftentimes, the signal will be routed to an adjacent port that communicates with a second wavelength division multiplexer within the optical add/drop device. Alternatively, the monochromatic signal may be routed to a separate optical add/drop device. Regardless, the profusion of fiber optical cables from the optical add/drop device is disorderly. Further, short lengths of fiber optic cables used to connect adjacent ports may be bent at a tight radius, which may lead to unacceptable losses in the strength of the signal. The fiber optic jumper of the invention solves at least the above-mentioned difficulties.

Figure 1:
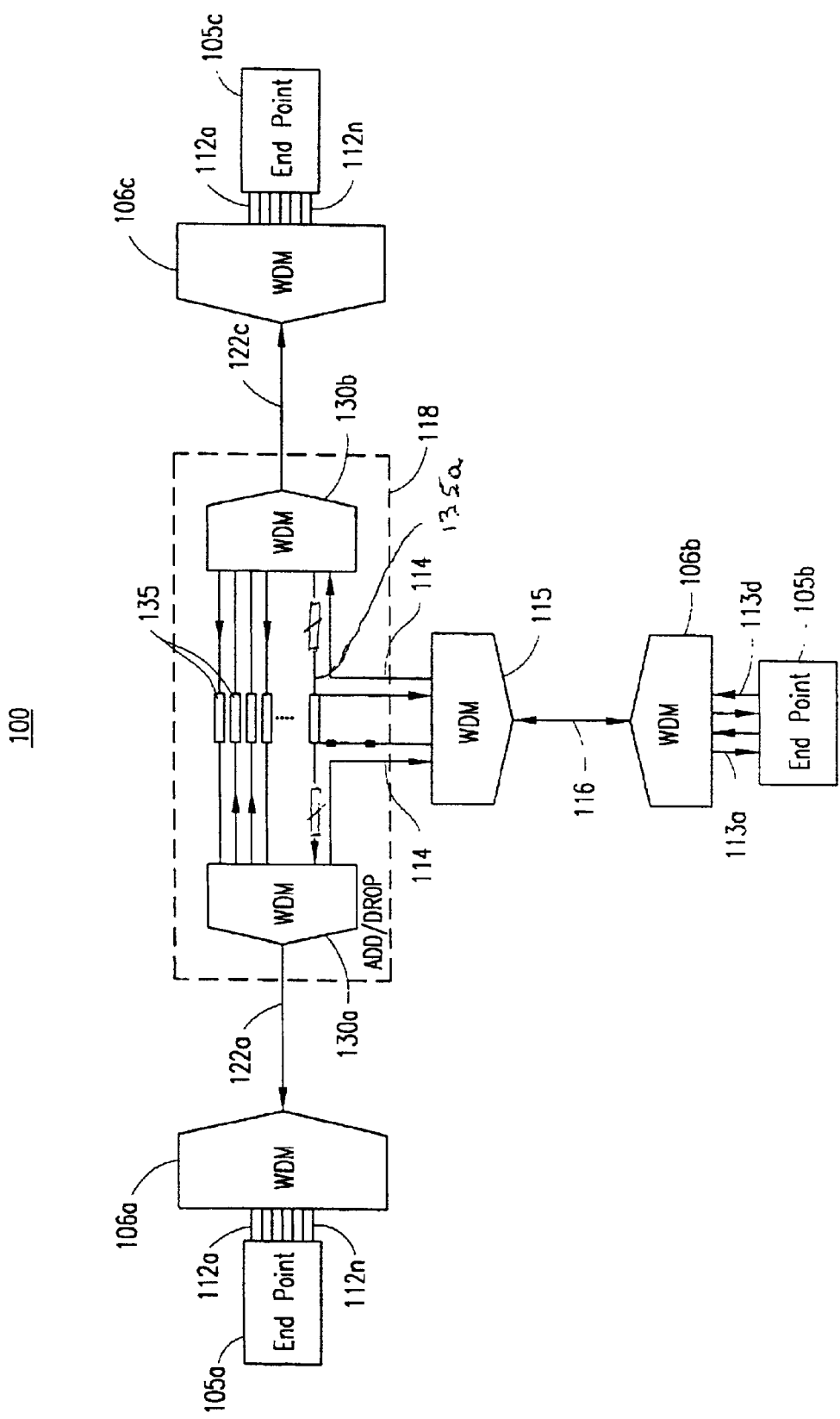
FIG. 1 is a schematic diagram of a fiber optic network utilizing the fiber optic jumper of the invention.

Referring now to FIG. 1, FIG. 1 is a block diagram of a fiber optic network 100 in accordance with an embodiment of the present invention. The fiber optic network 100 provides optical communication between end points 105a, 105b, and 105c. Each end point 105a, 105b, and 105c may be optically coupled to a wavelength division multiplexer (WDM) 106a, 106b, and 106c, respectively.

Each end point 105a and 105c communicates a multiple number of monochromatic optical signals via fiber optic lines 112a–112n to the associated WDM 106a–106c, respectively. The end point 105b communicates a multiple number of monochromatic optical signals via fiber optic lines 113a–113d to/from WDM 106b, which wavelength division multiplexes the signals from monochromatic optical lines 113a–113d to WDM 115 along fiber optic line 116.

Figure 3:
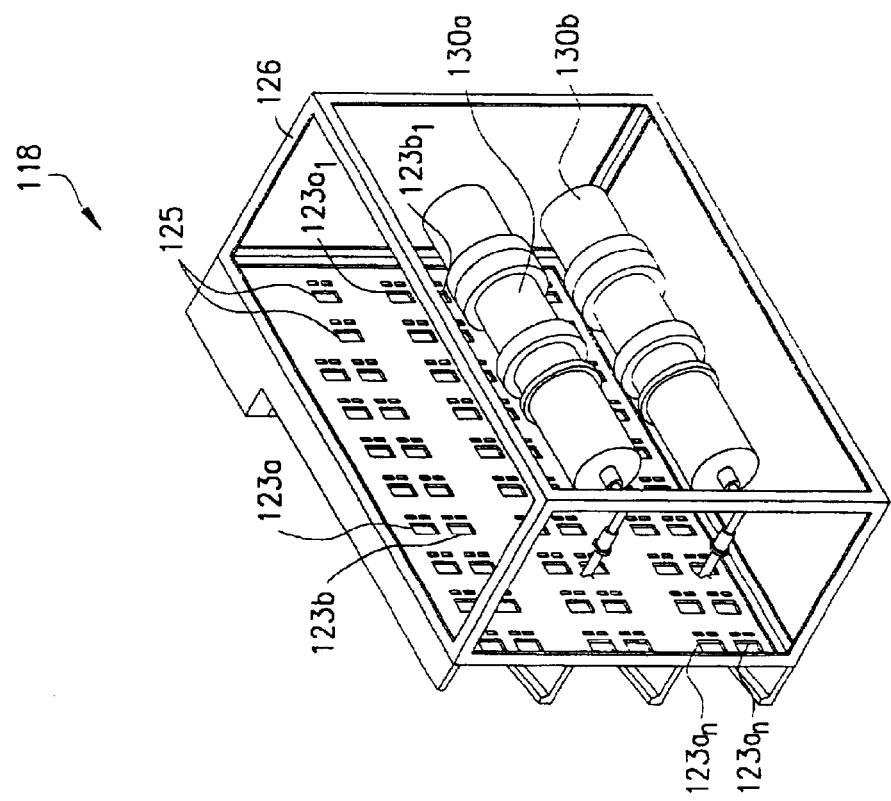
FIG. 3 is a rear perspective view of the optical add/drop of FIG. 1.
Figure 2:
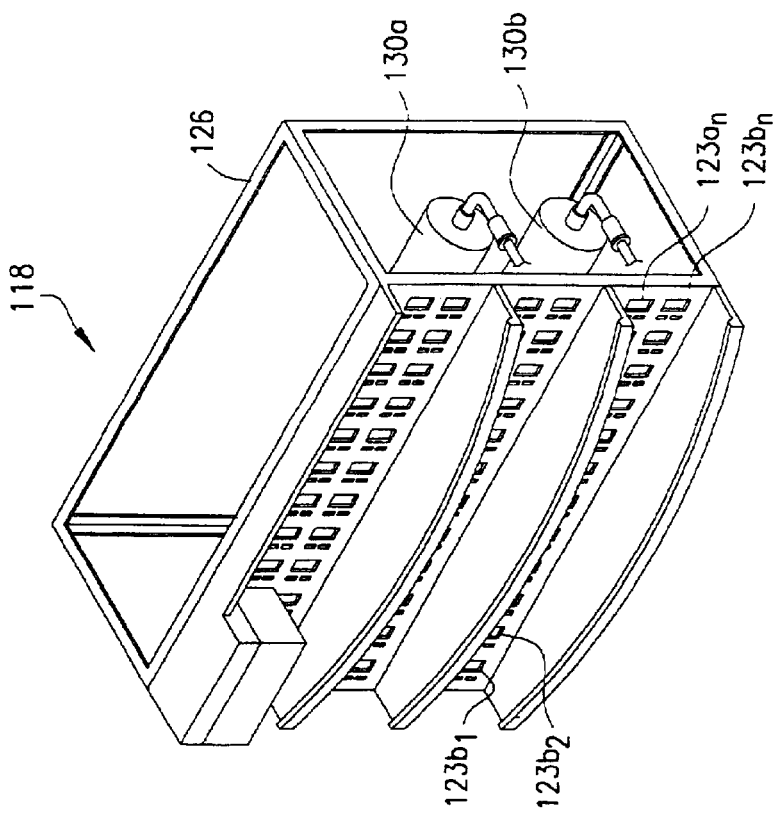
FIG. 2 is a front perspective view of the optical add/drop of FIG. 1.

Referring now to FIGS. 2 and 3, a perspective view of an exemplary OAD device 118 is shown. The OAD device 118 is, in general terms, a simple form of a wavelength router with two types of input/output (I/O) ports: Monochromatic I/O ports 123a, 123b and polychromatic ports 125. Monochromatic I/O ports 123a and 123b are used to pass through, add/drop, or disable monochromatic optical signals depending upon whether a jumper 135, fiber optic lines 114 or no connection is made with monochromatic I/O ports 123a and 123b. Additionally, a switchable jumper 135a may be inserted into a first port that is in communication with a first WDM 130a. The switchable jumper 135a may selectively communicate with a plurality of other ports for selectively routing a signal. For example, as shown in FIG. 1, switchable jumper 135a may route signals from WDM 130a to either WDM 130b or WDM 115.

OAD 118 has a housing 126 (FIGS. 2 and 3). For purposes of example, a plurality of pairs of rows of I/O ports $123a_1$ to $123a_n$ and $123b_1$ to $123b_n$ are shown, wherein upper I/O ports are designated by the numerals $123a_1$ and $123a_n$ and lower ports are designated by the numerals $123b_1$ and $123b_n$.

Referring back to FIG. 1, within the OAD device 118, a pair of WDM's 130a–130b (FIGS. 1–3) are utilized to demux or separate a received polychromatic optical signal into a plurality of monochromatic optical signals and mux or combine selected mono-chromatic signals into a polychromatic optical signal for communicating the resulting polychromatic optical signal to end point 105b, via fiber optic lines 114, or switchable jumper 135a which communicate with the WDM 115. Exemplary WDM's 130a and 130b are shown in greater detail in FIG. 4.

Figure 4:
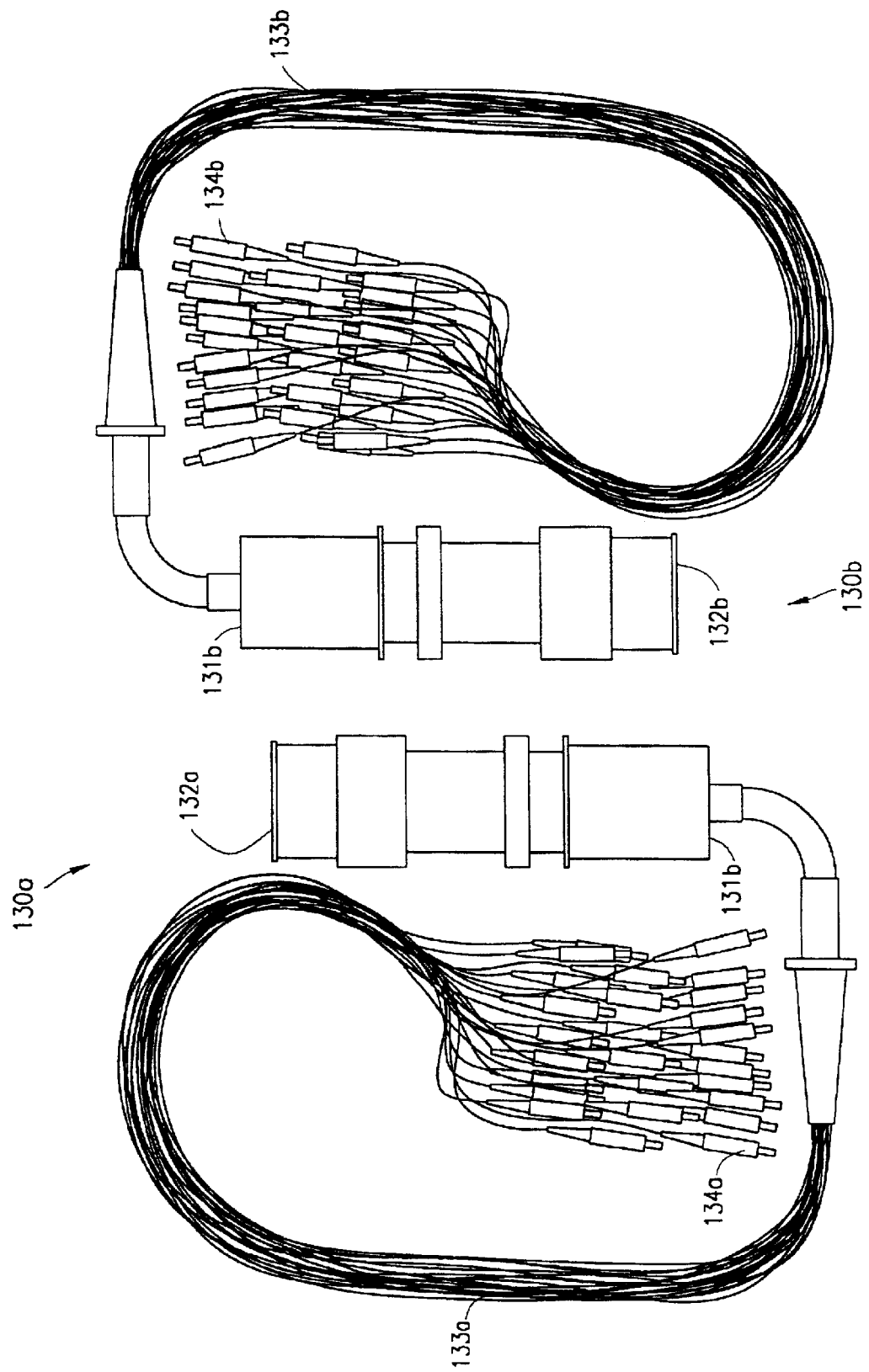
FIG. 4 is a plan view of two uninstalled wavelength division multiplexer (WDM) modules visible in FIGS. 1–3.

Referring now to FIG. 4, WDM 130a and WDM 130b each has an input/output end 131a, 131b, respectively, and a diffraction grating end 132a and 132b, respectively. A plurality of fiber optic lines 133a, 133b extend from a respective input/output end 131a, 131b (FIG. 4, not shown in FIGS. 2 & 3). In the preferred embodiment, fiber optic lines 133a, 133b include forty-nine monochromatic lines and a single polychromatic line, although other combinations are possible. Each fiber optic line 133a, 133b terminates at optical connectors 134a, 134b (FIG. 4). Fiber optic lines 133a, 133b of WDM 130a and WDM 130b may be selectively linked by an optical jumper 135 (FIGS. 1, 5–8) as explained below.

Figure 5:
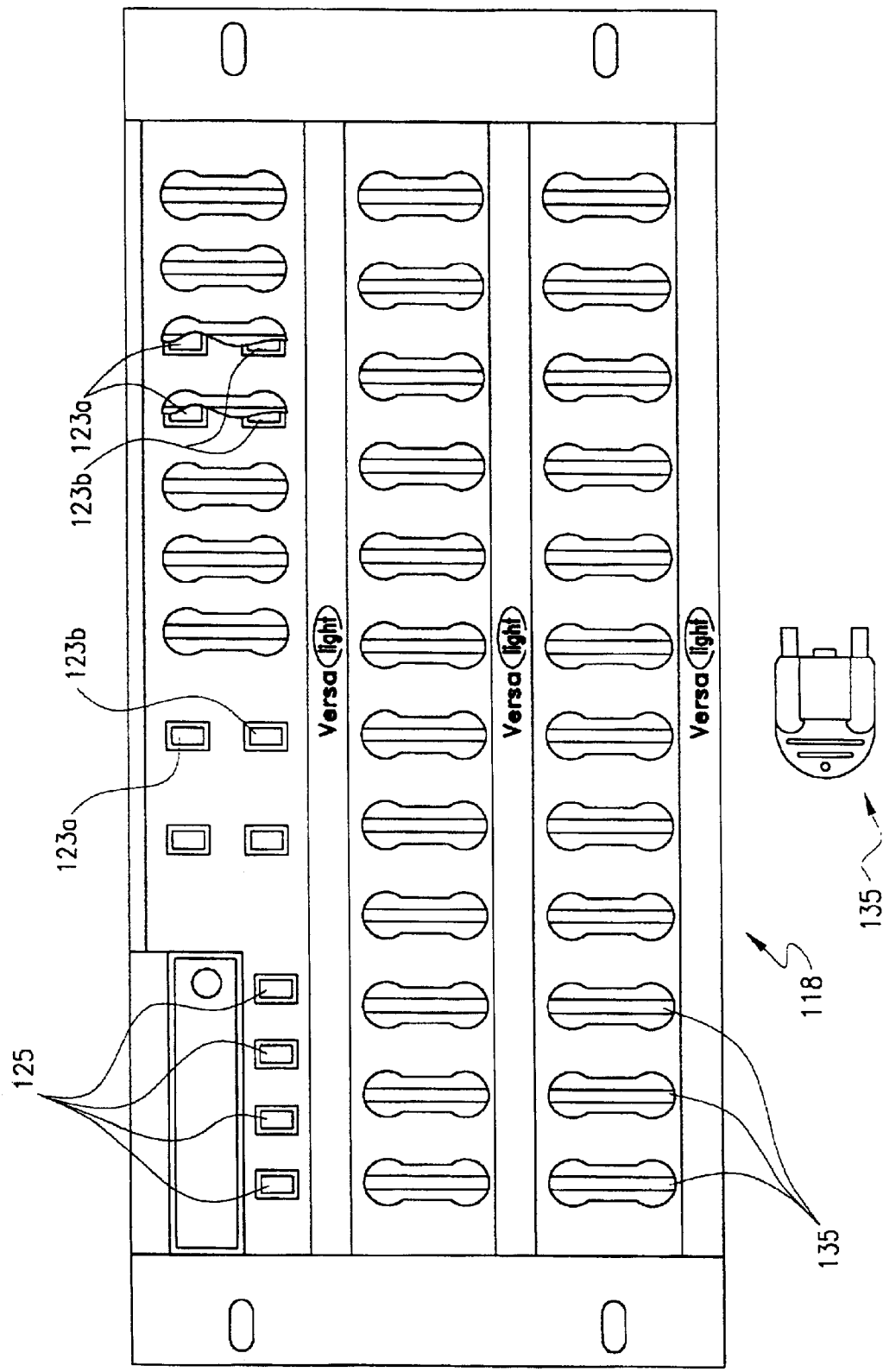
FIG. 5 is an elevational front view of the optical add/drop of FIGS. 1–3 having a plurality of jumpers installed therein.

Each optical connector 134a that is affixed to a fiber optic line 133a emanating from WDM 130a preferably communicates with one of a pair of ports, e.g. upper ports $123a_1$, and $123a_n$ (FIGS. 2 and 5). Corresponding fiber optic lines 133b, which emanate from WDM 130b, communicate with the other of the pair of ports, e.g. lower ports $123b_1$ to $123b_n$ (FIGS. 2 and 5). A single pair of ports, i.e., upper port 123a and lower port 123b, facilitates transfer of data of a selected monochromatic frequency or of polychromatic data from WDM 130a to WDM 130b. A selected monochromatic frequency or polychromatic data may be referred to generally as data types.

To communicate information from a fiber optic line 133a of WDM 130a to a fiber optic line 133b of WDM 130b, an optical jumper 135 is positioned in a selected one of ports 123a and ports 123b to communicate a selected data type with port 123a and port 123b. FIG. 5 shows a plurality of optical jumpers 135 installed on OAD 118. Each optical jumper 135 communicates a single upper port 123a with a single lower port 123b for transmitting a selected data type. In another embodiment, an optical jumper that is capable of transmitting data from several of ports $123a_1$ to $123a_n$ and $123b_1$ to $123b_1$, may also be utilized, for example a 4-connector jumper may be used.

Figure 6C:
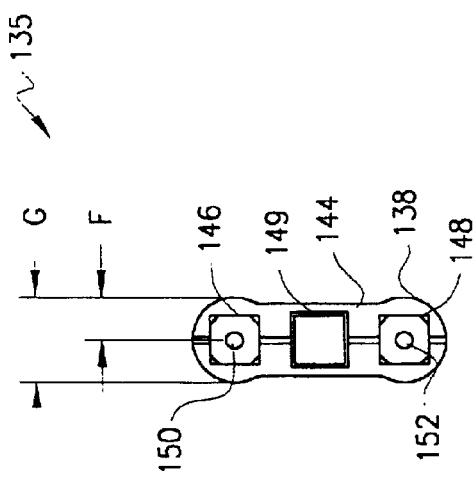
FIG. 6c is an elevational end view of the optic jumper of FIG. 5.
Figure 6A:
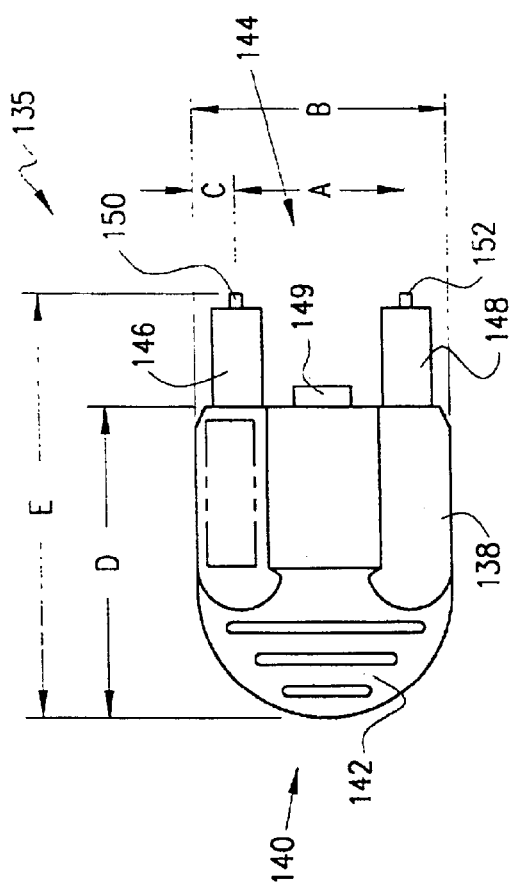
FIG. 6a is an elevational view of the optic jumper of FIG. 5.
Figure 6B:
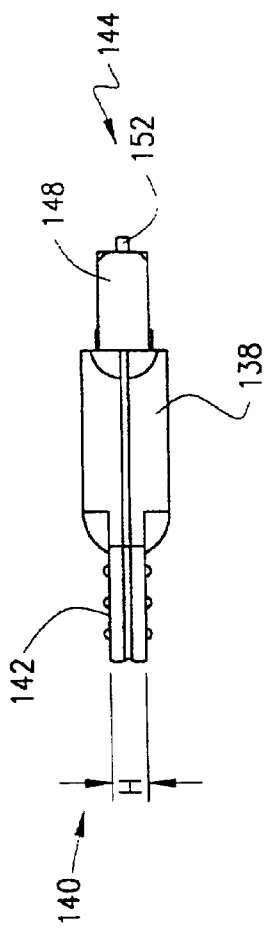
FIG. 6b is an elevational side view of the optic jumper of FIG. 5.

Short fiber jumpers or optical jumpers 135 are shown in greater detail in FIGS. 6a–6c. Referring now to FIGS. 6a–6c, optical jumper 135 has a casing 138 having an exposed or grip end 140 (FIGS. 6a, 6b). Casing 138 is preferably a plastic enclosure that is designed to protect internal components of the optical jumper 135 from possible damage. Preferably, exposed end 140 has a grip area 142 that is provided with a plurality of ridges composed of rubber or any other material to facilitate ease of gripping and insertion or removal of the optical jumper 135 within I/O ports 123a and 123b. Casing 138 of optical jumper 135 also has a connector end 144. A pair of connector prongs, i.e., first connector prong 146 and second connector prong 148, protrude from connector end 144 of optical jumper 135. Optical jumper 135 preferably has a 1 inch pitch or distance between the connector prongs 146, 148. A magnet 149 is located within casing 138 between connector prongs 146 and 148. Magnet 149 has a magnetic field capable of engaging a hall effect electronic switch 136, discussed in greater detail in FIGS. 8a and 8b, below.

Figure 7:
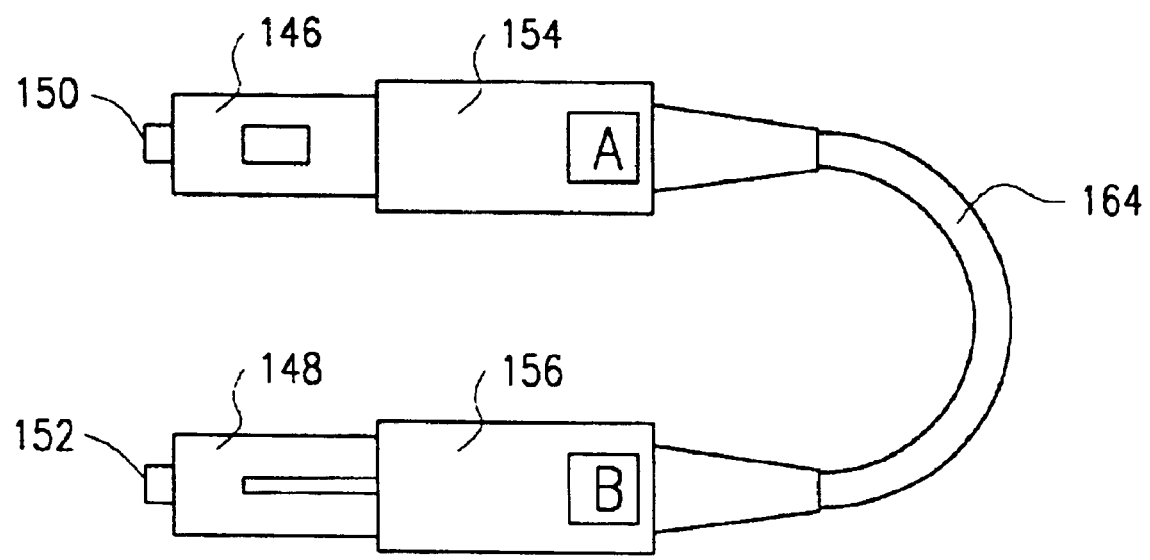
FIG. 7 is a plan view of an optic fiber loop used within the jumper of FIGS. 5–6c.

In one embodiment, connector prongs 146 and 148 are SC fiber connectors. Other possible optical connector types include SMA, ST, FDDI, ESCON, FC/PC, D4, and Biconic, or others. First protrusion 150 and second protrusion 152 extend from first connector prong 146 and second connector prong 148, respectively. First connector prong 146 and second connector prong 148 extend from optical connectors 154 and 156 respectively (FIG. 7). First connector prong 146 and second connector prong 148 are joined together by optical fiber 164. In one embodiment, optical fiber 164 is a Corning™ SMF-28 with standard 3 mm jacket.

It should be understood that other optical fibers suitable for carrying monochromatic and/or polychromatic signals in the wavelength range (i.e., C-band (1530–1563 nm) and L-band (1575–1610 nm)) of the fiber optic network 100 could additionally be utilized. Casing 138 should be designed to maintain a low loss bend radius of optical fiber 164. When assembled, the optical jumper 135 is compact. Dimensions of one embodiment of optical jumper 135 are as follows:

| Dimension | Measurement (inches) |
| --- | --- |
| A (FIGS. 6a) | 1.00 |
| B (FIG. 6a) | 1.66 |
| C (FIG. 6a) | 0.33 |
| D (FIG. 6a) | 2.06 |
| E (FIG. 6a) | 2.66 |
| F (FIG. 6c) | 0.33 |
| G (FIG. 6c) | 0.66 |
| H (FIG. 6b) | 0.31 |

In the preferred embodiment, a small Hall effect electrical component or sensor 136 (FIG. 8a) is located between each upper port 123a and lower port 123b on OAD 118. Hall effect electrical component 136 is mounted on an electrical circuit capable of providing an electrical switch function for the electrical presence indicating system. Additionally, LED 137 (FIGS. 8a and 8b) can be incorporated into the OAD 118 and electrically switched on or off by the Hall effect sensor 136 to provide an additional visible indication of the presence or removal of jumper or jumpers 135.

Figure 8A:
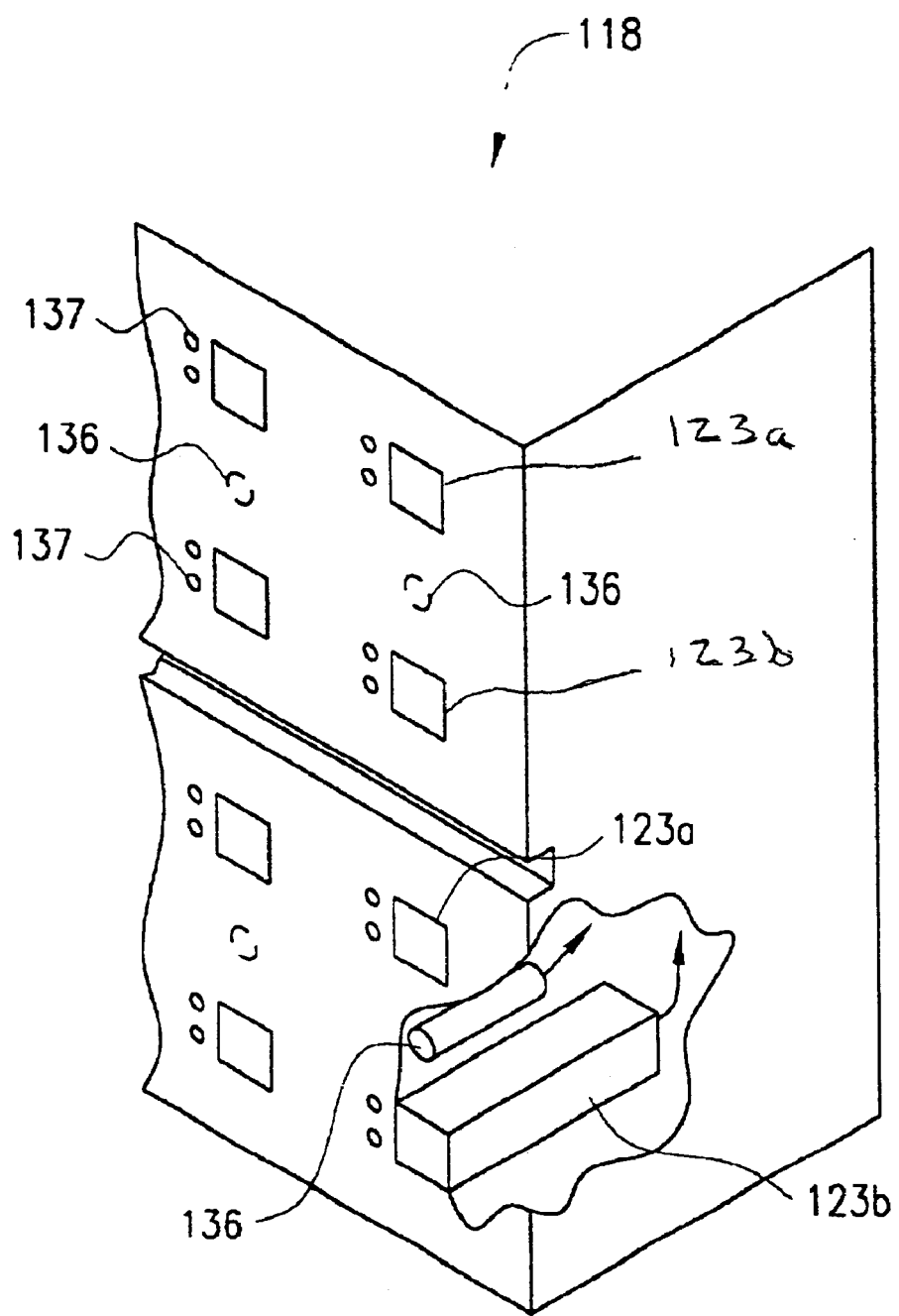
FIG. 8a is a cutaway perspective view of an embodiment of an optical add/drop device having presence indicators.
Figure 8B:
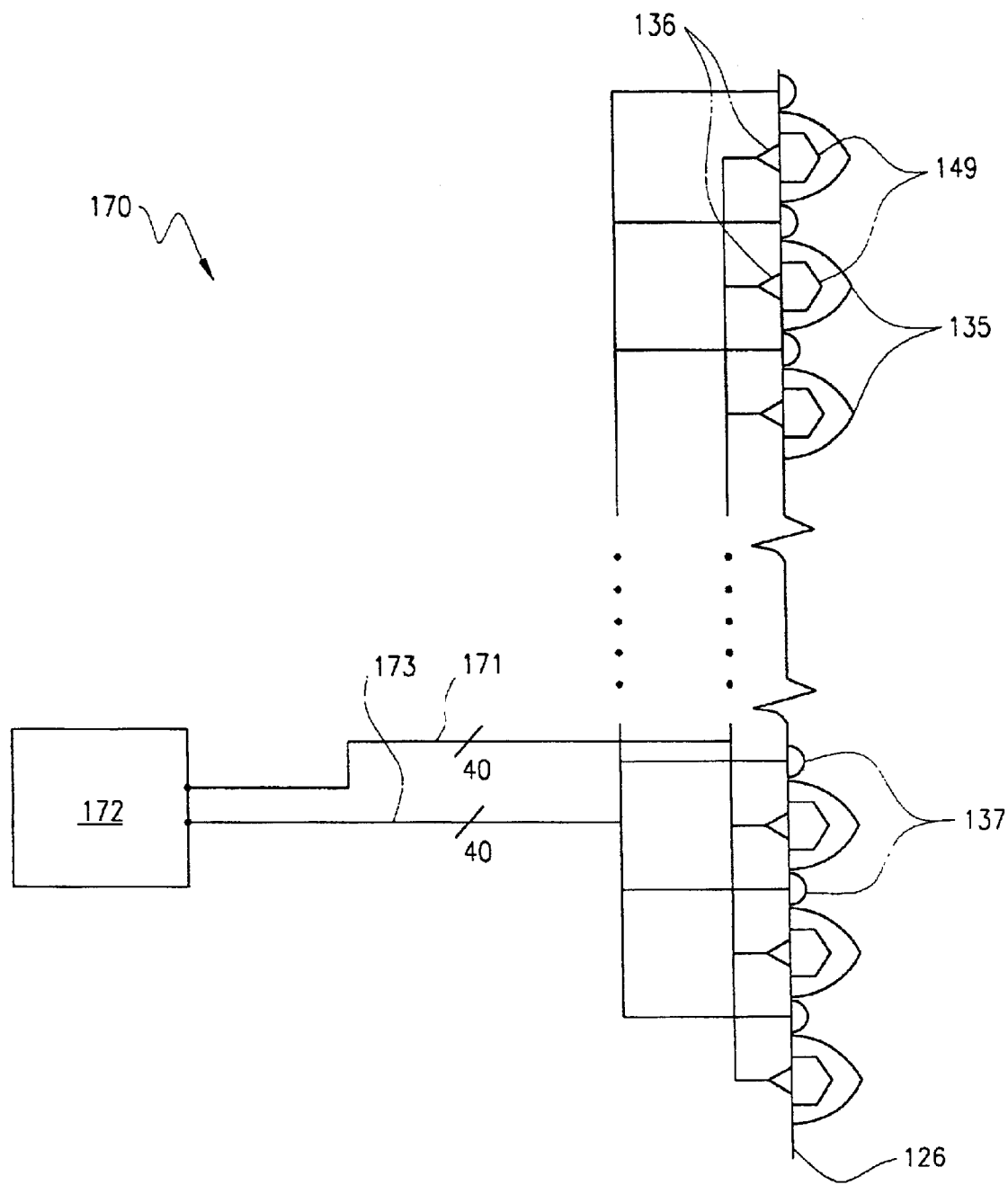
FIG. 8b is a schematic diagram of an LED panel controller.

Referring now to FIG. 8b, a schematic of the electronics that function as an LED panel controller 170 are shown. Optical jumpers 135 are schematically shown affixed in place on OAD 118. Magnets 149, which are contained within optical jumpers 135, communicate with a Hall effect sensor 136 that is located on OAD 118 between each of the upper I/O ports 123a and lower I/O ports 123b of OAD 118. A preferred Hall effect sensor 136 may be obtained from Allegro Microsystems, Inc. P/N A3210ELH. A preferred magnet 149 is a ¼ inch diameter by ¼ inch long magnet that may be obtained from McMaster-Carr P/N 57295K73. Preferably, magnet 149 and Hall effect sensor 136 are positioned such that they are spaced at a sensing distance of 0.5 inches apart, wherein "sensing distance" is defined as a straight line distance for the magnet 149 to the Hall effect sensor 136. Also, it is preferred that Hall effect sensors 136 are connected to a serial input scan chain. Bus 171 communicates the input data from the Hall effect sensors 136 to microprocessor 172 for each of the sensors 136. Microprocessor 172 then signals LEDs 137 to illuminate via bus 173 if an optical jumper 135 is installed within the corresponding I/O ports 123a and 123b. Preferably, OAD 118 is designed to receive 49 optical jumpers 135. Additionally, in a preferred embodiment, 49 Hall effect electronic components 136 are provided for sensing the presence of the 49 optical jumpers 135. However, other numbers of optical jumpers 135 and Hall effect components 136 may be used.

Referring primarily to FIG. 1, as an example of how the fiber optic network 100 operates, the end point 105a may be located in Boston, the end point 105b may be located in Hartford, and the end point 105c may be located in New York City. A network service provider in Boston (end point 105a), receives communication signals from local towns or cities via a communication system, such as a standard telephone network. The communication signals, which are destined to locations south of Boston (end point 105a), such as Hartford (end point 105b) and New York City (end point 105c), are time-division multiplexed onto monochromatic optical signals and delivered to the WDM 106a. The WDM 106a performs a wave division multiplexing operation on the monochromatic optical signals and the resulting polychromatic optical signal is transmitted onto the fiber optic network 100 via the fiber optic line 122a. Upon the polychromatic optical signal reaching a network service provider between Boston (end point 105a) and Hartford (end point 105b) at add/drop device 118, the polychromatic optical signal is demultiplexed by the WDM 130a in the wavelength add/drop device 118.

For example, in the case of performing a pass-through operation, the polychromatic signal will enter the WDM 130a on one of fiber optic lines 133a (FIG. 4) that are in communication with polychromatic I/O port 125 (FIGS. 2 and 5) that is intended to carry the polychromatic optical signal and that receives the polychromatic optical signal from fiber optic line 122a. WDM 130a demuxes the polychromatic signal and transmits a plurality of monochromatic signals over fiber optic lines 133a (FIG. 4), each of which communicate with a monochromatic I/O port, e.g. upper I/O port 123a in OAD 118 (FIG. 2). The monochromatic signal then passes through first connector prong 146 (FIGS. 6a–6c) of optical jumper 135 (FIGS. 1, 5–6c), through optical fiber 164 (FIG. 7), and through second connector prong 148 (FIG. 6a–6c). Second connector prong 148 communicates with the other I/O port, e.g. lower I/O port 123b (FIG. 2), which communicates with a selected fiber optic line 133b (FIG. 4) for receiving the monochromatic signal. The monochromatic signal is then transmitted via fiber optic line 133b to WDM 130b for remultiplexing. The multiplexed signal is then transmitted over a selected fiber optic line 133b that is in communication with polychromatic port 125 and communicates with fiber optic line 122c (FIG. 1) for transmission to New York City (end point 105c).

In the case of performing an add/drop function, the monochromatic signals destined for Hartford (end point 105b), on the other hand, may be routed by fiber optic lines 114 that communicate with other of selected lower I/O ports 123a or 123b for transmission to WDM 115 along with other monochromatic signals (having different wavelengths) for remultiplexing and delivery to the end point 105b in Hartford.

In addition, local communication signals originating from Hartford (end point 105b) may be added to either WDM 130a or 130b to be transmitted to either Boston (end point 105a) or New York City (end point 105c), respectively, based upon the optical frequency that the communication signals are placed. During such transmission, demuxed monochromatic optical signals are transmitted over optical cables 114 from WDM 115 to either WDM 130a or 130b. The monochromatic optical signals are multiplexed by WDM 130b into a polychromatic optical signal and demultiplexed by WDM 106c in New York City (end point 105c). It should be understood that the fiber optic lines (e.g., 112a–n, 122a, c, 114, 116) are bidirectional such that optical communication can be performed in either direction.

Experimental Results

Figure 9:
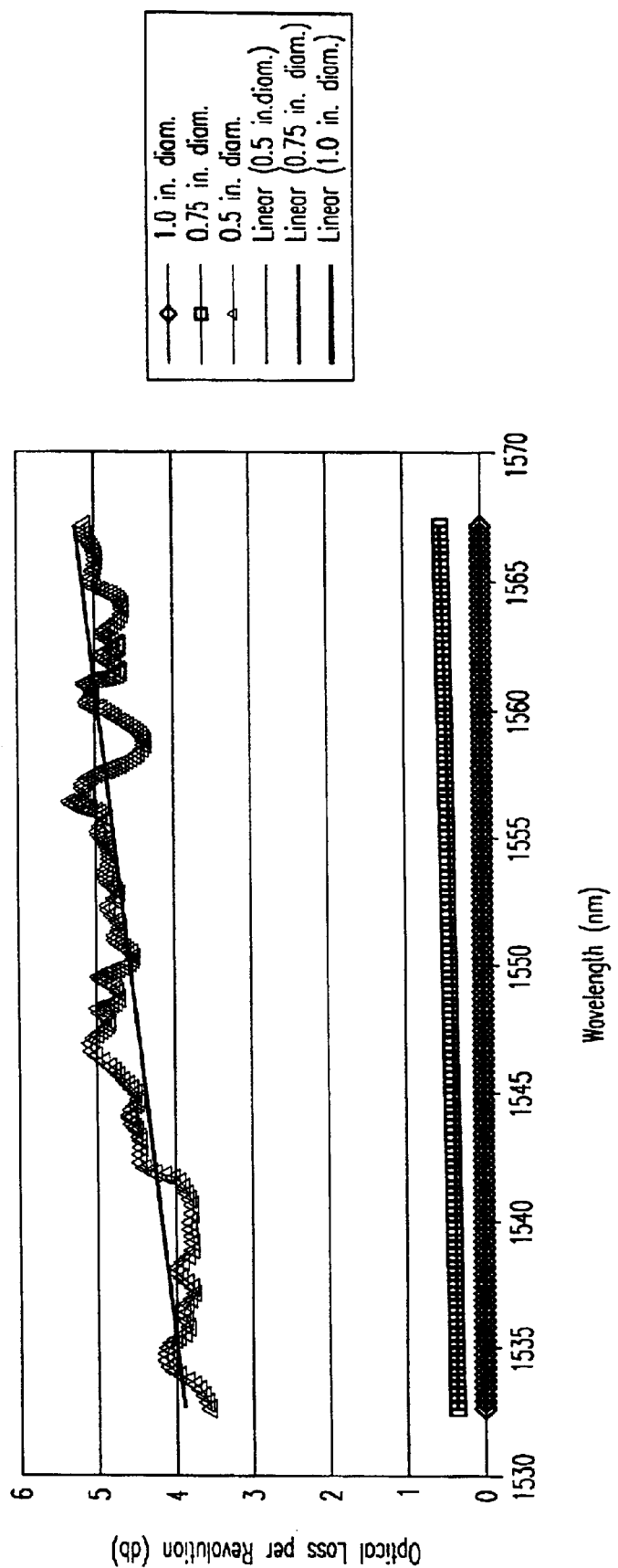
FIG. 9 is a plot of optical power loss versus wavelength for various bend diameters of fiber optic cable.

A study was done to determine optical loss versus bend radii of Siecor™ optical cable across an operational wavelength span. Three mandrels of outer diameters 1.0", 0.75", and 0.5" were used in the experiment. A 2 m FC/FC Cable-06/99-SM Fiber-TBII-OFNR (UL) OFN FT4 (CSA)) was wrapped multiple times (10×, 10×, and 5×, respectively) around the mandrels under light tension. An HP tunable laser was scanned across the wavelength span of interest and data points were automatically recorded. The data were normalized by the number of wraps around the mandrels to generate a loss per revolution in dB. The raw data are plotted in FIG. 9. It can be seen that there is greater sensitivity at the longer wavelengths to bend radius.

Figure 10:
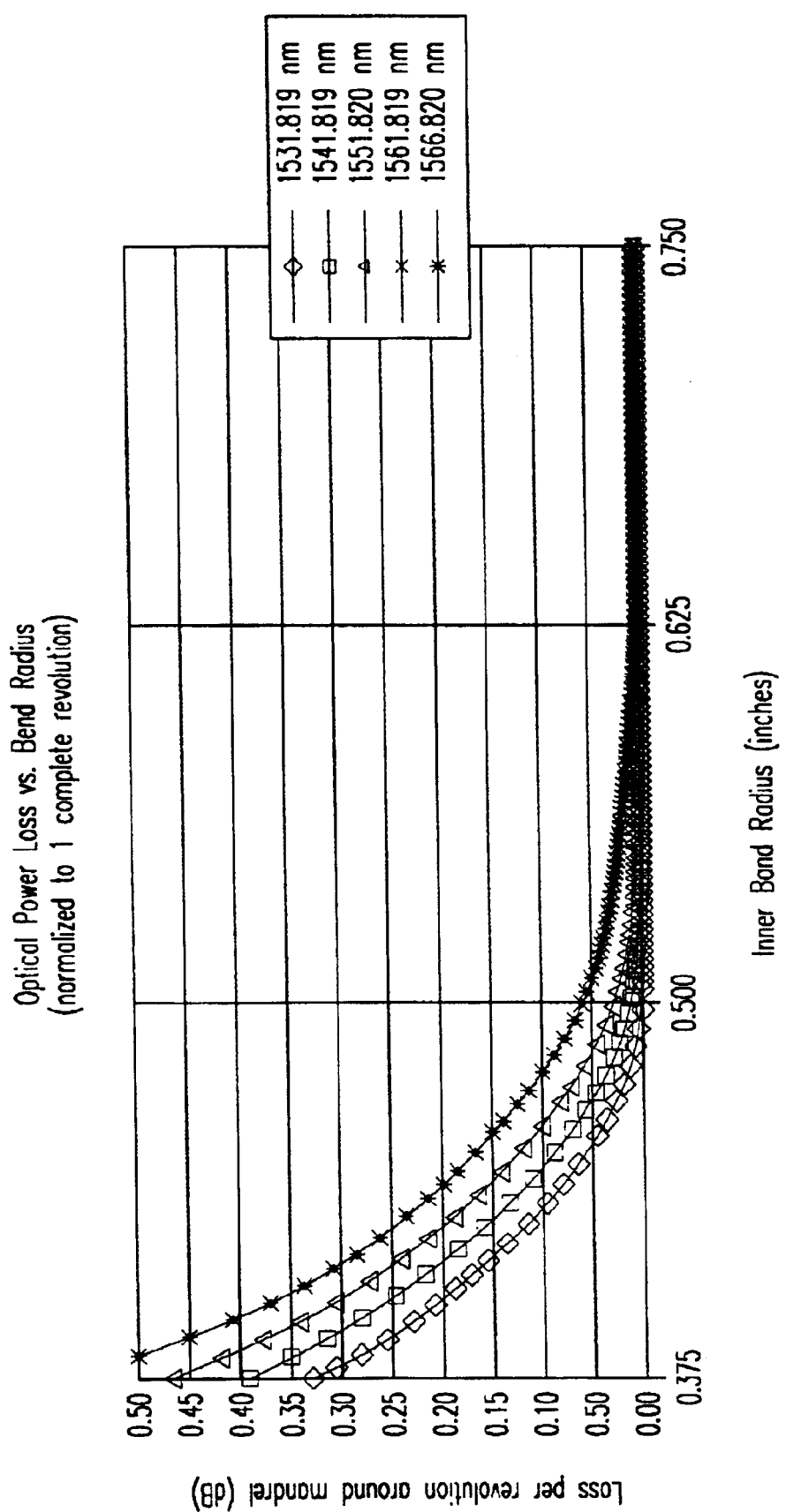
FIG. 10 is a plot using best fit lines through the data of FIG. 9 to simulate data showing optical loss versus bend radius.

The best-fit lines through the data were then used to simulate data in FIG. 10, which shows optical loss versus bend radius. The data used in the charts is shown in Table 2 below.

TABLE 2

| Inner Diameter (inches) | Inner radius (inches) | 1531.819 nm loss per rev. (dB) | 1566.820 nm loss per rev. (dB) |
|---|---|---|---|
| 0.25 | 0.125 | 48.5 | 50.1 |
| 0.3125 | 0.15625 | 26.0 | 28.4 |
| 0.375 | 0.1875 | 13.9 | 16.1 |
| 0.4375 | 0.21875 | 7.44 | 9.16 |
| 0.5 | 0.25 | 3.99 | 5.20 |
| 0.5625 | 0.28125 | 2.13 | 2.95 |
| 0.625 | 0.3125 | 1.14 | 1.68 |
| 0.6875 | 0.34375 | 0.61 | 0.95 |
| 0.75 | 0.375 | 0.33 | 0.54 |
| 0.8125 | 0.40625 | 0.18 | 0.31 |
| 0.875 | 0.4375 | 0.09 | 0.17 |
| 0.9375 | 0.46875 | 0.05 | 0.10 |
| 1 | 0.5 | 0.03 | 0.06 |
| 1.0625 | 0.53125 | 0.01 | 0.03 |
| 1.125 | 0.5625 | 0.01 | 0.02 |
| 1.1875 | 0.59375 | 0.00 | 0.01 |
| 1.25 | 0.625 | 0.00 | 0.01 |
| 1.3125 | 0.65625 | 0.00 | 0.00 |
| 1.375 | 0.6875 | 0.00 | 0.00 |
| 1.4375 | 0.71875 | 0.00 | 0.00 |
| 1.5 | 0.75 | 0.00 | 0.00 |

The data shown graphically in FIG. 10 demonstrates that the loss per revolution around the mandrel (dB) is greater for a smaller inner bend radius. The loss per revolution is greatly reduced as the inner bend radius is increased.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An optical jumper comprising:
    a casing having an exposed end and a connector end;
    an optical fiber having a firer connector on a first end and a second connector on a second end, wherein said first connector and said second connector are disposed at said connector end; and
    a magnet carried by said casing for engaging a sensor in a mounting device.

2. The optical jumper according to claim 1 wherein said optical fiber has an inner bend radius greater than approximately 0.4 inches.

3. The optical jumper according to claim 1 wherein said magnet is located between said first connector and said second connector.

4. The optical jumper according to claim 1 further comprising:
    a grip area on said exposed end of said casing.

5. The optical jumper according to claim 1 wherein said first connector and said second connector are approximately 1 inch apart.

6. The optical jumper according to claim 1, wherein said first connector and said second connector are between approximately ½ and approximately 1½ inches apart.

7. The optical jumper according to claim 1, wherein said optical fiber has an inner bend radius between approximately 0.4 inches and 0.75 inches.

8. A method of detecting a presence of an optical jumper in an optical add/drop device comprising the steps of:
    providing a magneto-resistive device proximate ports for an optical jumper;
    providing a magnet on said optical jumper;
    installing said optical jumper in said ports; and
    detecting a presence of said magnet with said magneto-resistive device.

9. The method according to claim 8 further comprising the step of:
    indicating the presence of said optical jumper with an indicator.

10. An optical add/drop system comprising:
    a first WDM having a plurality of first fiber optic lines for carrying monochromatic signals and at least one first fiber optic line for carrying polychromatic signals extending therefrom;
    a second WDM having a plurality of second fiber optic lines for carrying monochromatic signals and at least one second fiber optic line for carrying polychromatic signals extending therefrom;
    a first group of ports operatively connected to said plurality of first fiber optic lines;
    a second group of ports operatively connected to said plurality of second fiber optic lines; and
    at least one optical jumper having an optical fiber with a first connector on a first end of the optical fiber and a second connector on a second end of the optical fiber, said first connector for connecting to at learnt one of said first group of ports and said second connector for connecting to at least one of said second group of ports for facilitating optical communication between said at least one first fiber optic line of said first WDM and said at least one second fiber optic line of said second WDM.

11. The optical add/drop system according to claim 10 further comprising:
    a sensor proximate at least one of said first group of ports and at least one of said second group of ports for detecting a presence of an optical jumper proximate said ports.

12. The optical add/drop system according to claim 11 wherein said sensor is a magneto-resistive device for sensing the presence of magnet carried by said optical jumper.

13. The optical add/drop system according to claim 12 wherein said sensor is a Hall effect sensor for sensing the presence of a magnet carried by said optical jumper.

14. The optical add/drop system according to claim 11 wherein said optical jumper has a magnet carried by said casing for activating said sensor in the optical add/drop device.

15. The optical add/drop system according to claim 14 wherein said magnet is located between said first connector and said second connector.

16. The optical add/drop system according to claim 10 wherein:
   said optical jumper has a casing having a connector end; and
   said first connector and said second connector are disposed at said connector end.

17. The optical add/drop system according to claim 16 wherein said casing has an exposed end having a grip area.

18. The optical add/drop system according to claim 16 wherein said first connector and said second connector are spaced approximately 1 inch apart.

19. The optical add/drop system according to claim 16, wherein said optical fiber has an inner bend radius of greater than approximately 0.4 inches.

20. The optical add/drop system according to claim 16, wherein said optical fiber has an inner bend radius between approximately 0.4 inches and 0.75 inches.

21. The optical add/drop system according to claim 16, wherein said optical jumper transmits an optical signal with an optical loss of less than 0.75 dB.

22. The optical add/drop system according to claim 16 further comprising:
   an LED proximate at least one of said groups of ports for indicating the presence of an optical jumper within said ports.

23. The optical add/drop system according to claim 10 further comprising:
   means for sensing a presence of an optical jumper proximate said ports.

* * * * *